May 22, 1956
E. ARUNDALE
2,746,908
SWEETENING PROCESS USING AN ALDEHYDE
AND A SOLID ACID CATALYST
Filed Aug. 9, 1953
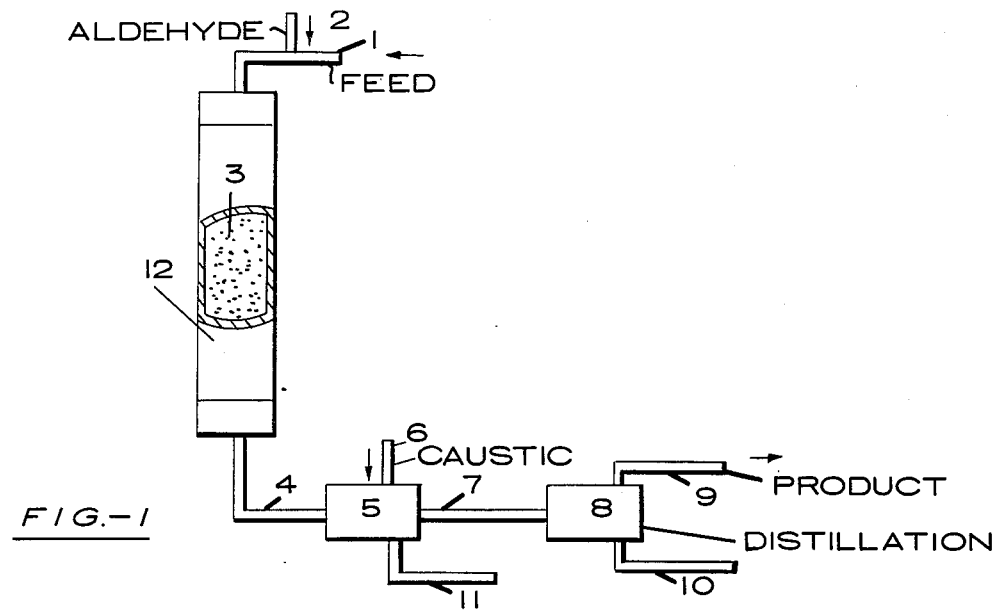
FIG.-1
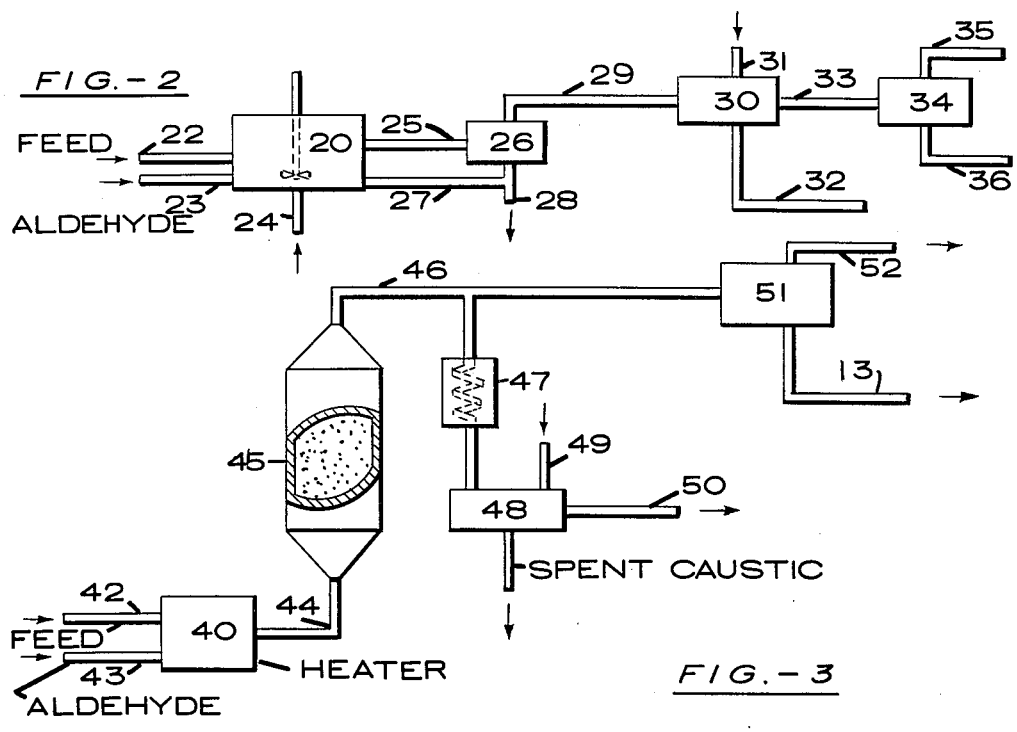
FIG.-2
FIG.-3
ERVING ARUNDALE INVENTOR
BY W. O. T Heilman ATTORNEY

United States Patent Office 2,746,908
Patented May 22, 1956

2,746,908

SWEETENING PROCESS USING AN ALDEHYDE AND A SOLID ACID CATALYST

Erving Arundale, Westfield, N. J., assignor to Esso Research and Engineering Company, a corporation of Delaware Application August 6, 1953, Serial No. 372,705

8 Claims. (Cl. 196—35)

The present invention is concerned with an improved process for the production of high quality petroleum products. The invention is more particularly concerned with the employment of a solid acidic catalyst in conjunction with an aldehyde for the treatment of virgin and cracked distillates boiling below about 700° F., in order to obtain improvement in odor, color, oxidation stability, deposit forming characteristics, and the like. A particularly desirable adaptation of the present invention is to use the solid acidic catalyst in a fixed or fluidized bed and to contact said catalyst with the distillate and a relatively small amount of an added aldehyde.

In the production of high quality non-deposit forming petroleum products, as for example in the production of petroleum products boiling in the motor fuel boiling range, it is known to use a wide variety of treating and refining procedures. These procedures in general are directed toward removing constituents from the motor fuels which cause harmful results to the engine when consumed. The procedures are also directed toward retaining in the gasolines and other products the desirable constituents and are also directed toward securing maximum yields of the desired products. In the chemical treatment of petroleum fractions boiling in the motor fuel boiling range, the use of concentrated sulfuric acid is well known. This acid removes sulfur compounds as well as various diolefins and related compounds which cause deleterious results in the engine when the fuel is burned. While the use of sulfuric acid produces a satisfactory product in many cases, certain problems exist with respect to its use. For example, when a cracked stock is treated with concentrated sulfuric acid for the removal of mercaptans and other sulfur compounds as well as certain olefinic constituents, excessive polymerization of both the desirable and undesirable hydrocarbon constituents occurs, thereby resulting in an increase in the loss of gasoline to higher boiling polymers. Furthermore, when sulfuric acid is used in order to satisfactorily free the hydrocarbon fraction of undesirable constituents, it is necessary to subsequently sweeten the gasoline, usually by means of the so-called "doctor treat."

In accordance with the present invention, a solid acidic catalyst is employed in conjunction with an aldehyde as, for example, formaldehyde or acetaldehyde, for improving the quality of petroleum distillates. The process of the present invention may be more fully understood by reference to the drawings illustrating several adaptations of this treating process.

Figure 1 illustrates a continuous process wherein the aldehyde and oil feed are passed through a fixed bed of acidic catalyst.

Figure 2 describes a slurry operation, while Figure 3 illustrates a vapor phase process wherein the acidic particles are maintained in a fluidized state by means of upflowing oil and aldehyde vapors.

Referring specifically to Figure 1, hydrocarbon feed boiling in the range below about 700° F. is introduced into the system by means of feed line 1.

An aldehyde which is soluble in the distillate, for example, acetaldehyde, gaseous formaldehyde, or the like, is added through line 2 and the mixture passed downward through a fixed bed of solid acidic catalyst 3 in zone 12. The flow rate and temperature in this bed are controlled to secure the desired extent of treating. The treated effluent is removed from bed 3 through line 4 and charged to zone 5. A weak (2 to 5%) caustic soda solution is added to zone 5 through line 6 to remove traces of acidic materials. The spent caustic is then removed by means of line 11. The oil is transferred to distillation zone 8 by means of line 7. A distillate product is removed overhead by means of line 9 and the high boiling by-product withdrawn through line 10.

Referring specifically to Figure 2, the hydrocarbon feed and aldehyde are introduced into treating zone 20 by means of lines 22 and 23 respectively. The mixture is agitated in zone 20 with the solid acidic catalyst (in powdered or granular form) which is introduced through line 24. A slurry of catalyst and treated product overflows from zone 20 through line 25 and into zone 26. Here the catalyst is separated by filtration or sedimentation and recycled to treating zone 20 through line 27 or withdrawn through line 28. The catalyst-free product is removed from zone 26 by means of line 29 and carried to zone 30 where sodium hydroxide solution is added through line 31. The washed product is removed through line 32 or passed to distillation zone 34 through line 33. A distillate product is removed overhead through line 35 and the high boiling bottoms withdrawn through line 36.

Referring specifically to Figure 3, the petroleum distillate and aldehyde treating agent are passed into furnace 40 by means of lines 42 and 43. The vaporized mixture is removed through line 44 and enters the bottom of treating zone 45. Treating zone 45 contains a fixed or fluidized bed of solid acidic catalyst. The bed is maintained in the fluidized condition by the vapors entering through line 44. The vapor overhead from treating zone 45 is transferred to distillation zone 51 through line 46. The overhead product from distillation zone 51 is removed through line 52, condensed and finished by caustic or water washing. Alternatively, the overhead from treating zone 45 can be condensed in zone 47 and transferred to zone 48 where it is washed with caustic soda solution which enters through line 49. The caustic washed product is removed from the unit through line 50. If desired, the catalyst in treating zone 45 can be removed to another vessel, regenerated as for example, by burning with air, and then reintroduced into zone 45 for further use. The regeneration can also be carried out in zone 45 after discontinuing the addition of petroleum distillate thereto.

The temperatures employed in the contacting operation are in the range from about 75° F. to 500° F. In the liquid phase operation the temperature is preferably in the range from about 75° to 150° F., whereas in the vapor phase process, it is in the range of 300° to 500° F.

Formaldehyde and acetaldehyde are the preferred agents. The formaldehyde may be added as aqueous "Formalin" solution, gaseous formaldehyde, alkyl Formcel solutions, hemi-formals, or paraformaldehyde. Acetaldehyde and paraldehyde may likewise be utilized since they are normally completely miscible with hydrocarbon feed stocks.

The amount of aldehyde employed will vary depending upon the character of the feed stock, its unsaturation, mercaptan content and the like, the particular solid catalyst utilized and upon other operating conditions. In general, it is preferred to use from about 0.05 to 5%, preferably an amount in the range from 0.1 to 1.5 weight percent, based upon the oil feed.

The particular acidic catalyst employed may comprise any solid component containing acidic centers or added acidic materials. For example, a silica-alumina catalyst wherein the quantity of alumina present is in the range from about 10% to 16% by weight can be employed. Other preferred catalysts may comprise sulfuric acid or phosphoric acid deposited on a solid support such as kieselguhr, silica, carbon, alumina, pumice and the like. Other satisfactory catalysts are hydrohalogen acids such as HCl or HF deposited on carriers such as alumina or silica. Ion exchange resins containing acidic groups are also useful.

The amount of acid employed on the support will vary with the acid and carrier used. The acid normally will be in the range of 5% to 75% by weight based upon the total weight. Use of excessive acid should be avoided since the catalyst will become pasty, in which condition it is of little use.

The process of the present invention may be more fully understood by reference to the following examples illustrating the same:

*Example 1*

94.5 grams of 87.7% sulfuric acid were added to 120 grams of 14–20 mesh silica gel with stirring and 160 grams of the resulting granular catalyst were charged to a percolation column 72 cm. high. Two grams of acetaldehyde were added to 500 cc. (392.3 gms.) of a virgin distillate boiling between 325° to 430° F., possessing an API gravity of 47.7° and a copper number (milligrams of mercaptan sulfur per 100 cc.) of 34. This homogeneous mixture was percolated through the column over a period of three hours at 75° F. The effluent was subsequently caustic-washed and found to possess a copper number of 3.

*Example 2*

148.5 grams of granular UOP #2 cataylst (75% $H_3PO_4$ on kieselguhr) were placed in a percolation column 79 cm. high. 500 cc. of the virgin distillate (as in Example 1) containing 2 grams of acetaldehyde were passed through the column over a 2⅓ hour period. After caustic washing, the effluent possessed a copper number of 1.

The process of the present invention is also useful for improving the engine cleanliness characteristics and oxidation stability of motor fuels especially thermally and catalytically cracked gasolines. It results in the production of gasolines having lower sulfur, gum, diene, and peroxide contents.

The stock treated may have a boiling range from about 50° F. to 700° F. although it is preferred that the final boiling point be not in excess of 500° F. The process can be applied to the treatment of hydrocarbon distillates such as heavy naphthas, kerosenes, heating oils, diesel fuels, petroleum solvents and the like. It is to be understood that the entire fraction may be treated or that specific boiling range fractions may be segregated and separately treated. Various cycle stocks secured from refining operations can likewise be treated in the manner described.

What is claimed is:

1. A continuous process for the removal of undesirable constituents from a petroleum distillate boiling below about 700° F. comprising the steps of adding to said distillate from about 0.05% to about 5% by weight of an aldehyde, subsequently contacting the resulting mixture with a solid acid catalyst in the reaction zone in the temperature range of from about 75° F. to about 500° F., withdrawing treated petroleum product from said reaction zone, and separating aldehyde from treated petroleum product.

2. The process of claim 1 wherein said aldehyde is acetaldehyde.

3. The process of claim 1 wherein said aldehyde is formaldehyde.

4. The process of claim 1 wherein the amount of aldehyde used is from about 0.1% to 1.5% by weight.

5. The process of claim 1 wherein said acid catalyst comprises a solid carrier impregnated with sulfuric acid.

6. The process of claim 1 wherein said catalyst comprises a solid carrier impregnated with an acid of phosphorus.

7. A continuous process for the removal of undesirable constituents from a petroleum distillate boiling below about 700° F. comprising the steps of adding to said distillate from about 0.5% to 5% by weight of an aldehyde selected from the group consisting of formaldehyde and acetaldehyde, subsequently contacting the resulting mixture in liquid form with a finely divided solid acid catalyst in a reaction zone in the temperature range of from about 75° F. to 150° F., separating a treated product from said finely divided acid catalyst, and separating treated petroleum product from aldehyde.

8. A continuous process for the removal of undesirable constituents from a petroleum distillate boiling below about 700° F. comprising the steps of adding to said distillate from about 0.1% to 1.5% by weight of an aldehyde selected from the group consisting of formaldehyde and acetaldehyde, subsequently vaporizing said mixture, passing said vaporized mixture through a bed of fluidized finely divided solid acid catalyst maintained at a temperature in the range of from about 300° F. to 500° F., separating treated product from said catalyst, and separating aldehyde from said treated product.

References Cited in the file of this patent

UNITED STATES PATENTS

| | | |
|---|---|---|
| 1,827,538 | Nastukoff | Oct. 13, 1931 |
| 1,914,953 | Malishev | June 20, 1933 |
| 1,935,162 | Morrell | Nov. 14, 1933 |
| 2,063,933 | Ipatieff | Dec. 15, 1936 |

FOREIGN PATENTS

| | | |
|---|---|---|
| 113,131 | Great Britain | Feb. 6, 1918 |

OTHER REFERENCES

Ormandy et al.: J. I. P. T., vol. 10, pages 99 and 100.